United States Patent [19]

Greer

[11] Patent Number: 5,049,306

[45] Date of Patent: Sep. 17, 1991

[54] OXYGEN GENERATING CANDLES

[75] Inventor: John S. Greer, Ellwood City, Pa.

[73] Assignee: Mine Safety Appliances Company, Pittsburgh, Pa.

[21] Appl. No.: 414,323

[22] Filed: Sep. 29, 1989

[51] Int. Cl.$^5$ .............................................. C01B 11/14
[52] U.S. Cl. .............................. 252/187.31; 252/187.1
[58] Field of Search ...................... 252/186.21, 187.31, 252/62.62; 423/594, 632

[56] References Cited

U.S. PATENT DOCUMENTS

| | | | |
|---|---|---|---|
| 3,089,855 | 5/1963 | Bovard | 252/187.31 |
| 3,207,695 | 9/1965 | Gustafson | 252/187.31 |
| 3,293,187 | 12/1966 | Markowitz | 252/187.31 |
| 3,725,156 | 4/1973 | Thompson | 252/187.31 |
| 3,736,104 | 5/1973 | Churchill et al. | 423/579 |
| 3,749,678 | 7/1973 | Thompson | 252/187.31 |
| 3,901,730 | 8/1975 | Louzos | 252/187.31 |
| 4,073,741 | 2/1978 | Heintz | 252/187.31 |
| 4,448,761 | 5/1984 | Sarnecki et al. | 423/632 |
| 4,606,843 | 8/1986 | Kaczur | 252/186.33 |

Primary Examiner—Robert L. Stoll
Assistant Examiner—Joseph D. Anthony

[57] ABSTRACT

Alkaline earth metal and transition metal ferrates are used as burning catalysts and chlorine scavengers in chlorate candle oxygen generating compositions.

6 Claims, No Drawings

OXYGEN GENERATING CANDLES

FIELD OF THE INVENTION

The invention relates to compositions for generating oxygen and more particularly to the well-known chlorate candle type.

BACKGROUND OF THE INVENTION

Conventional chlorate candles burn to release oxygen when ignited and comprise a primary oxygen source of chlorates or perchlorates and a metallic powder or fiber, usually iron, to provide a source of heat for the thermal decomposition of the chlorate or perchlorate. The candles conventionally contain $BaO_2$ that acts both as a catalyst for maintaining an even burning rate and as a scavenger for chlorine that is produced during burning. The candle compositions contain a fiber binder, e.g. glass fiber, ceramic fiber or steel wool. Effective proportions of $BaO_2$ range from about 2 to 6%, with 4% most often being used. See, for example, U.S. Pat. Nos. 3,089,855 and 3,207,695.

Under Environmental Protection Agency regulations the presence of barium in excess of established amounts in leachate tests has a characteristic of EP toxicity. Accordingly, it is desirable to eliminate or reduce the barium content of chlorate candles to avoid the need for special disposal requirements for expended candles.

BRIEF SUMMARY OF THE INVENTION

In accordance with this invention, the $BaO_2$ in chlorate candles is replaced by an alkaline earth metal or transition metal ferrate. The ferrate anion catalyzes burning, and the alkaline earth or transition metal cation acts as a chlorine scavenger.

Ferrates are compounds with iron and oxygen in the anion. Ferrate anions may contain various proportions of iron and oxygen and may be mixture of anions, solid solutions or complex crystal structures. Ferrates suitable for use in this invention have sufficient oxygen to give an apparent iron valence of more than +3. The associated metal cation may be any group 2A metal having an atomic number between 12 and 56 (i.e. magnesium, calcium, strontium or barium), manganese, cobalt, nickel or zinc. Magnesium is preferred.

The oxygen candles preferably comprise between about 7 to 10% iron powder, 6 to 8% fiber binder, 2 to 6% metal ferrate, with the remainder being an alkali metal chlorate, preferably sodium chlorate $NaClO_3$. It should be recognized that the ferrates are effective in modified candle compositions with other additives such as perchlorates, or when iron is provided in whole or in part by iron fiber, with or without another fiber binder.

DETAILED DESCRIPTION OF THE PREFERRED EMBODIMENT

Magnesium ferrate was prepared according to the method of Bashkirov, L. A.; Palkin, A. P. and Sirota, N. N., "Formation of Ferrites During Decomposition of Salts" *Ferrity, Fiz. i Fiz.-Khim. Svoistva, Doklady 3-go A'Sesoyuz. Soveschaniya* (1960), 111-116 c.f. *C.A.*55:8141e. Equimolar proportions of $Mg(NO_3)_2$ and $Fe(NO_3)_3$ are dissolved in distilled water and precipitated with an excess of $(NH_4)_2CO_3$. The precipitate is filtered, washed twice with distilled water and removed for drying at 100° C. The mixture is fired at 300-320° C. to form $MgFeO_4$, which is ground to <200 mesh.

A mixture of 80% (by weight) $NaClO_3$, 8% iron powder, 7% fiberglass and 4% $MgFeO_4$ is blended and pressed in a mold to form a coherent candle body. When ignited, the candle combustion was self-propagating and burned at an even rate. Burning rate, oxygen evolution and chlorine release were substantially the same as from a candle containing 4% $BaO_2$, instead of $MgFeO_4$. Similar results are obtained with $MnFeO_4$; when $(Mg-Co)FeO_4$ is used the candles show some bubbling and expansion when burned.

Other methods of preparing alkaline earth and transition metal ferrates are described in Scholder, R.; Bunsen, H. V. and Zeiss, W., "Orthoferrates" *Zeit. Anorg. and Allgem. Chem.* 283, 330-7 (1956) c.f. *C.A.*50: 11151b and Scholder, R.; Kindervater, F. and Zeiss, W., "Metaferrates" *Zeit. Anorg. and Allgem. Chem.* 283, 338-45 (1956) c.f. *C.A.*50: 11151d.

It is to be understood that this invention may be practiced otherwise than as specifically described within the scope of the appended claims.

I claim:

1. An oxygen candle comprising an alkali metal chlorate, iron, a fiber binder and containing between about 2 and 6% of a metal ferrate in which the iron has a valence greater than +3 and in which the metal is an alkaline earth metal having an atomic number between 12 and 56, or a transition metal selected from manganese, cobalt, nickel or zinc.

2. An oxygen candle according to claim 1 in which the chlorate is sodium chlorate.

3. An oxygen candle according to claim 1 in which the metal is magnesium.

4. An oxygen candle according to claim 2 in which the metal is magnesium.

5. An oxygen candle according to claim 1 containing between about 7 to 10% iron powder, 6 to 8% fiber binder, 2 and 6% metal ferrate, the remainder being sodium chlorate.

6. An oxygen candle according to claim 5 in which the metal is magnesium.

* * * * *